Nov. 18, 1958
D. L. CAUBLE
2,860,517
PUMP CONTROL
Filed Aug. 10, 1953
2 Sheets-Sheet 2
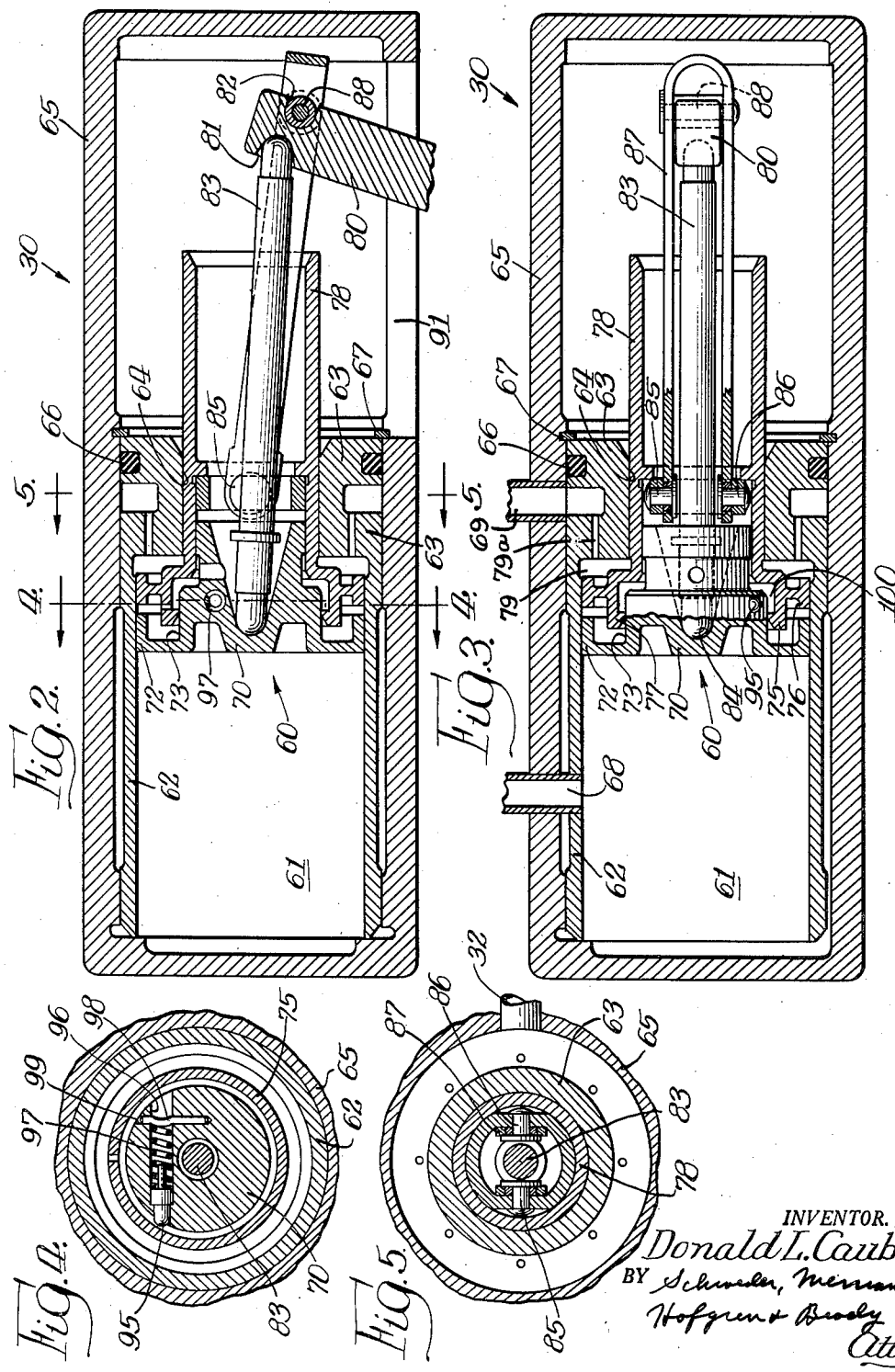
INVENTOR.
Donald L. Cauble,
BY Schroeder, Merriam,
Hofgren & Brady
Atty's.

United States Patent Office 2,860,517
Patented Nov. 18, 1958

2,860,517
PUMP CONTROL

Donald L. Cauble, Rockford, Ill., assignor to Sundstrand Machine Tool Co., a corporation of Illinois Application August 10, 1953, Serial No. 373,237

3 Claims. (Cl. 74—60)

This invention relates to a pump control and more particularly to a control for a variable displacement pump.

It is the general object of this invention to produce a new and improved pump control of the character described.

It is a further object of the invention to produce a control for a variable displacement pump including a compound piston having a pair of piston parts together with means connecting the piston parts to opposite sides of the displacement varying means for the pump, and means for moving the compound piston, thus to move the displacement varying means.

A more specific object of the invention is to produce a control for a wobbler type pump, with the control including a compound piston having a pair of piston parts together with means connecting each piston to an opposite side of the wobbler and to include in such control fluid pressure means for urging the piston parts together, thus to clamp the wobbler for movement with the compound piston, with said fluid pressure serving also to move the compound piston and thus to tilt the wobbler to vary the displacement of the pump.

Another object of the invention is to produce a control of the type described in the preceding paragraphs wherein the control piston is mounted in a casing mounted on the pump casing and wherein the displacement varying means is provided with a portion extending through aligned openings in both casings and to provide in such a control fluid pressure means for moving the control piston together with means for sealing off the openings from the control fluid pressure.

Other and further objects and advantages of the invention will be readily apparent from the following description and drawings, in which:

Fig. 2 is an enlarged sectional view showing the control casing and control piston;

Fig. 3 is a view like Fig. 2 but taken 90° therefrom;

Fig. 4 is a sectional view taken along line 4—4 of Fig. 2; and

Fig. 5 is a sectional view taken along line 5—5 of Fig. 2.

Figure 1:
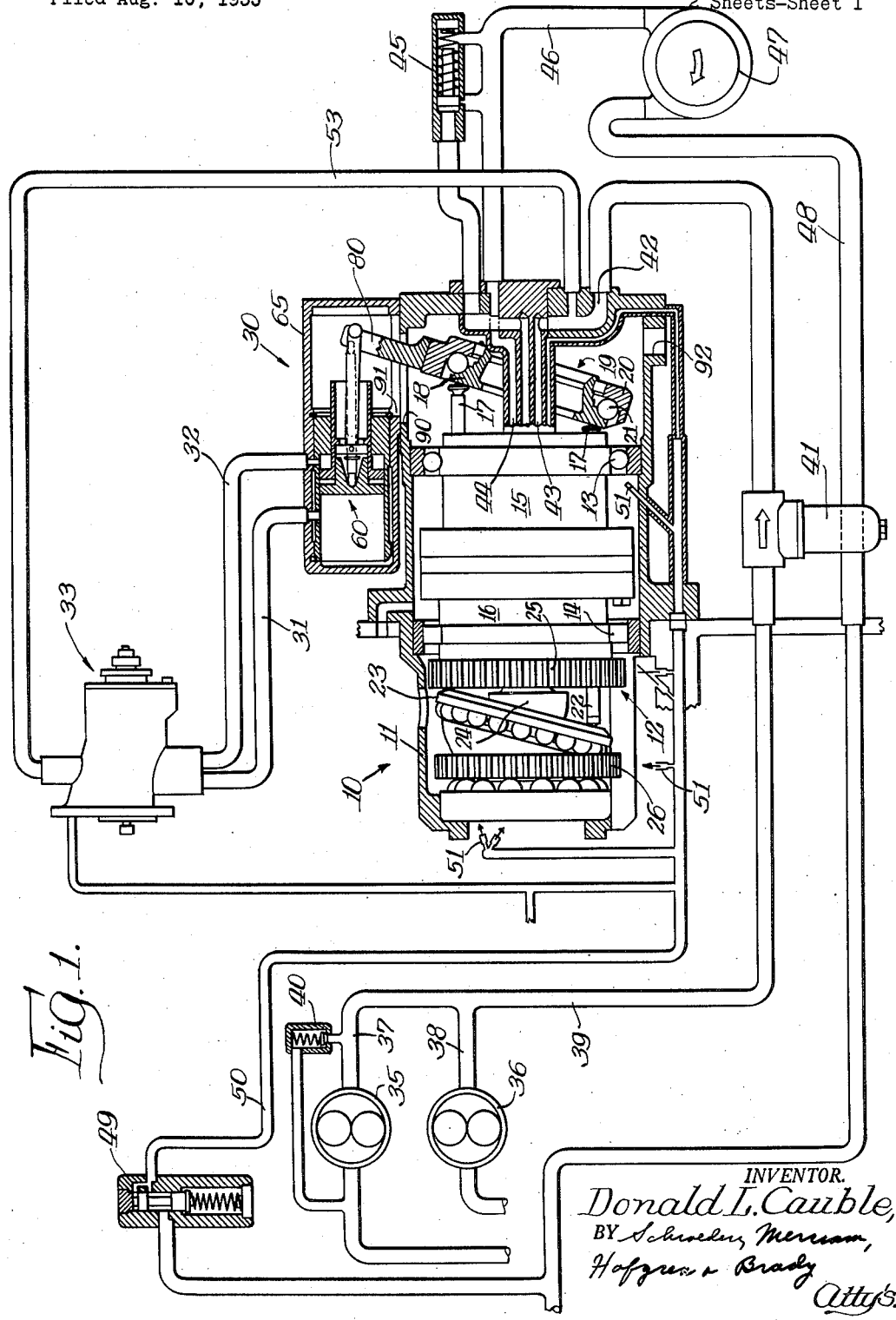
Fig. 1 is a schematic view showing the invention as incorporated in a constant speed drive.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

While it will be readily apparent to those skilled in the art that the invention hereof has many applications, particularly for varying the displacement of a variable displacement pump, and by the same token providing a means for varying the displacement of a fluid motor, it is herein shown and described in a form for varying the displacement of a variable displacement multiple piston wobbler type pump in a constant speed hydraulic transmission of the type more fully described and claimed in the Sadler et al. application filed December 4, 1951, as Serial No. 259,872. Such a transmission is generally indicated at 10 in Fig. 1 of the drawings and includes a casing 11 inclosing a cylinder block 12 rotatably supported therein on bearings 13 and 14. The right-hand portion of the cylinder block (as seen in Fig. 1) comprises a pump 15 which drives a motor 16. The pump includes a plurality of axial pistons 17 reciprocable in a plurality of axial cylinders aligned in an annular row around the cylinder block. The pistons are moved through their discharge strokes by contact with a face portion 18 of a wobbler 19. The face portion 18 is rotatably supported on the body portion 20 of the wobbler by bearings 21.

The pump includes a plurality of pistons 22 reciprocable in a plurality of cylinders arranged in an annular row in the cylinder block, with the pistons bearing against a swash plate 23 fixed to a shaft 24. Means in the form of a drive gear 25 is provided for rotating the cylinder block. In aircraft installations the drive gear will be rotated by the aircraft engine and at speeds depending upon the speeds of the engine. The output of the transmission is by means of a driven gear 26 fixed to the shaft 24. In the particular embodiment illustrated, the transmission is used for driving an alternator generator at a constant speed regardless of the speed of rotation of the aircraft engine; and for this purpose control means, generally designated 30, are provided for adjusting the angle of the wobbler, thus to vary the displacement of the pump 15. As the pump drives the motor, and thus the shaft 24, variations in displacement of the pump produce different relative speeds of rotation of the drive gear 25 and the driven gear 26.

The control device 30 is operated by fluid under pressure delivered thereto through a pair of conduits 31 and 32 controlled by valve mechanism incorporated in a governor 33. The governor is designed to be driven by the output of the transmission and thus is sensitive to the speed of the driven element and operates in response to variations in and departures from a desired speed to vary the fluid pressure in the conduits 31 and 32 to effect the control, all as more fully described in said Sadler et al. application.

While the control fluid delivered to the governor 33 may come from any suitable source, it is herein shown as moved by a pair of gear pumps 35 and 36 which may comprise the engine lubricating pumps of the aircraft engine. The pumps 35 and 36 deliver fluid under pressure into passages 37 and 38 which connect with a main oil passage 39. A pressure relief valve 40 is provided for limiting the pressure in the passage 39.

The passage 39 connects to a filter 41 and ultimately to a passage 42 formed in the casing 11. The passage 42 connects with a conduit 43 directing oil under pressure into the valve chamber of the cylinder block 12 for reciprocating the pistons 17 on their intake strokes and for making up any leakage of oil during operation of the transmission. From the valve chamber oil is directed into conduit 44, through a pressure differential valve 45 and into a conduit 46. This latter conduit directs the oil through a cooler 47 and into a conduit 48 connected to a pressure reducing valve 49 discharging into a conduit 50 terminating in a plurality of lubricating jets 51 for lubricating the valve parts of the engine.

Oil under pressure for control purposes is provided by means of a passage 53 connecting at one end to the passage 42 in the casing and at the other end to the governor 33 for regulation thereby before being directed into the passages 31 and 32.

For the purposes of control of the displacement of the pump 15 there is provided a compound piston 60 reciprocable in a cylinder 61 defined by a sleeve portion 62 of a ring member 63. The member 63 is provided with an annular opening 64 therein and is fixed in the casing 65 of the control device 30 and maintained in sealing engagement therewith by an O-ring 66. The ring member 63 is held in position by means of a snap ring 67 fitting within the casing 65.

The compound 60 comprises a first piston part 70 having an annular portion 72 slidably and sealingly engaging the interior surface of the sleeve 62, and a second piston portion 75 also having an annular surface 76 similarly engaging the interior surface of the sleeve 62. The piston portion 70 is provided with an annular surface 73 over which slides an annular portion 77 of the second piston part together with a skirt 78 formed integrally with the second piston part and extending through the opening 64 in the ring member 63.

The wobbler is provided with a lever 80 fixed thereto, with the lever having recesses 81 and 82 on opposite sides of the upper end thereof. Seated in the recess 81 is a first arm 83 whose opposite end seats in a recess 84 formed on the back surface of the first piston part 70 with the arm 83 extending through the skirt 78. Pivotally secured to the interior of the skirt 78 by pins 85 and 86 is a generally U-shaped arm 87 having at its opposite end a cross shaft 88 seated in the recess 82.

Fluid pressure introduced through the port 68 is directed into the cylinder 61 and serves to urge piston part 70 toward the right (as seen in Figs. 2 and 3) while fluid pressure introduced into a space 79 through port 69 and passage 79a urges piston part 75 toward the left. The result of the foregoing is to urge the piston parts 70 and 75 together and thus to urge the arms 83 and 87 toward movement in opposite directions but toward each other, with such movement serving to clamp the lever 80 between the outermost ends of the arms. The clamping arrangement is such as to permit relative pivotal movement between the arms and the lever as the wobbler is tilted. Fluid pressure is maintained in the cylinder 61 and in the space 79 and thus the piston parts are constantly urged toward each other. The operation of the governor valve is to vary such pressure as to cause the total pressure on one piston part to exceed the pressure on the other piston part and thus excess of fluid pressure applied against one side of the second piston part 75 over the fluid pressure applied against the opposite end of the piston part 70 serves to cause the pistons to move together, thus to effect tilting of the wobbler. As the piston parts, while urged toward each other, are prevented from actually contacting each other by the arms 83 and 87 resulting from the contact of the arms with opposite sides of the lever 80, it can be seen that no play or lost motion can develop in the connection between the lever 80 and the compound piston 60. Thus for any movement of the compound piston, an immediate and accurate responsive movement of the lever 80 will result.

The lever 80 extends through an opening 90 in the cylinder block casing 11, with the opening 90 being aligned with an opening 91 formed in the control piston casing 65. The casing 11 is provided with a drain opening 92 for draining off lubricating fluid and inasmuch as the right-hand end (as seen in the drawings) of the casing 65 is open to the interior of the casing 11, it is of course necessary that that portion of the control casing be sealed off from the cylinder 61 to prevent loss of control fluid pressure. For this purpose the annular portions 72 and 76, previously described, together with the sealing fit between the skirt 78 and the annular opening 64 serve to seal off the right-hand end of the casing 65 from the left-hand or cylinder end thereof.

In order to provide for ease of assembly of the compound piston, the piston part 70 is provided with a detent pin 95 (see Fig. 4) slidably received in a drilled opening 96 and urged outwardly by a spring 97 seating at one end against the pin and at the other end against a retaining pin 98 pressed into a suitable drilled hole 99 formed in that piston part. When the piston parts are first assembled together and the first piston part seated in the second piston part, the pin 95 is depressed by the annular portion 77 and then, as the parts come together, protrudes into a space 100 and thus serves to lock the piston parts against disassembly while still permitting some slight relative movement therebetween.

It will be understood from the foregoing that there has been provided a control means for a variable displacement fluid device particularly adapted for use in a wobbler type pump wherein the various parts may readily be assembled and adequate and complete control over the wobbler assured.

I claim:

1. Control means for the wobbler of a multiple piston wobbler type variable displacement pump comprising a cylinder, a first piston part having an annular portion slidably engaging the walls of the cylinder, a second piston part having an annular portion slidably engaging the walls of the cylinder and spaced from the first mentioned annular portion, a skirt on said second piston part extending axially of the cylinder away from the first piston part, means for introducing control fluid under pressure into opposite end portions of said cylinder to move said piston parts together and to move said piston parts axially of said cylinder as a unit, and means for connecting the piston parts to the wobbler including a first element having one end in contact with the side of the first piston part sealed from control fluid in the cylinder by said annular portions and extending through the skirt with its other end being connected to the wobbler, and a second element having one end connected for movement with the second piston part and extending through said skirt with its other end being connected to the wobbler, the interior of said skirt being sealed from control fluid in the cylinder by said annular portions.

2. In combination with a multiple piston wobbler type variable displacement pump having a casing with an opening therein, means for tilting the wobbler comprising a hollow control device casing mounted on the pump casing and having an opening aligned with the opening in the pump casing, a lever secured to the wobbler for tilting the same to vary the displacement of the pump, said lever extending through said openings exteriorly of the pump casing and into the control device casing, means defining a cylinder at one end of said control device casing, a first piston part having an annular portion slidably engaging the walls of the cylinder, a second piston part having an annular portion slidably engaging the walls of the cylinder and spaced from the first mentioned annular portion, a ring member fixed in the control device casing and facing one end of said cylinder, a skirt on said second piston part extending axially of the cylinder away from the first piston part and slidably and sealingly engaging the interior surface of the ring member to provide with the ring member a seal isolating the portion of the control device casing having said opening therein from said cylinder, means for introducing control fluid under pressure into opposite end portions of said cylinder to move said piston parts together and to move said piston parts axially of said cylinder as a unit, and means for connecting the piston parts to the lever including a first arm having one end in contact with the side of the first piston part sealed from control fluid in the cylinder by said annular portions and extending through the skirt with its other end bearing against one side of the lever, and a second arm pivotally secured to the interior of the skirt and extending therethrough with its other end bearing against the opposite side of the lever, the interior of the skirt being sealed from control fluid in the cylinder by said annular portions.

3. A control device comprising a cylinder, a compound control piston in the cylinder, said piston having spaced first and second piston parts reciprocable in the cylinder, a movable control member positioned exteriorly of the cylinder, means connecting the control piston to the control member including a first element mounted to be moved by said first piston part and extending from the control piston in one direction to have a portion bearing against one side of the control member, a second element mounted to be moved by said second piston part and extending from the control piston in said direction to have a portion bearing against the opposite side of the control member, and means for introducing control fluid under pressure into said cylinder on opposite sides of said control piston to move said piston axially in the cylinder and to urge said piston parts toward each other to clamp said control member between said portions for movement with the control piston.

References Cited in the file of this patent

UNITED STATES PATENTS

| | | |
|---|---|---|
| 379,806 | Nash | Mar. 20, 1888 |
| 1,119,758 | Kings | Dec. 1, 1914 |
| 1,418,953 | Martin | June 6, 1922 |
| 1,668,304 | Caldwell | May 1, 1928 |
| 2,146,117 | Geros | Feb. 7, 1939 |
| 2,185,277 | Stelzer | Jan. 2, 1940 |
| 2,552,310 | Doeg | May 8, 1951 |
| 2,604,076 | Trevaskis | July 22, 1952 |
| 2,693,243 | Strandell | Nov. 2, 1954 |